(12) United States Patent
Lee (10) Patent No.: US 10,848,188 B2
(45) Date of Patent: Nov. 24, 2020

(54) VEHICLE, METHOD OF CONTROLLING THE SAME, AND ANTENNA FOR VEHICLE

(71) Applicants: Hyundai Motor Company, Seoul (KR); Kia Motors Corporation, Seoul (KR)

(72) Inventor: Sang Heun Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/701,637

(22) Filed: Dec. 3, 2019

(65) Prior Publication Data

US 2020/0328762 A1 Oct. 15, 2020

(30) Foreign Application Priority Data

Apr. 10, 2019 (KR) .................. 10-2019-0041937

(51) Int. Cl.
*H04B 1/00* (2006.01)
*H04B 1/18* (2006.01)
*H01Q 1/32* (2006.01)
*H04B 1/10* (2006.01)

(52) U.S. Cl.
CPC .......... *H04B 1/006* (2013.01); *H01Q 1/3275* (2013.01); *H04B 1/1027* (2013.01); *H04B 1/18* (2013.01); *H04B 2001/1072* (2013.01)

(58) Field of Classification Search
CPC .... H04B 1/006; H04B 1/0053; H04B 1/1027; H04B 1/18; H04B 2001/1072; H01Q 1/3275
See application file for complete search history.

(56) References Cited

U.S. PATENT DOCUMENTS

| 5,572,213 A * | 11/1996 | Noneman | H04B 1/0007 342/13 |
| 2005/0225679 A1* | 10/2005 | Okanobu | H03J 1/0008 348/571 |
| 2008/0166984 A1* | 7/2008 | Shie | H04B 1/18 455/201 |

FOREIGN PATENT DOCUMENTS

KR 10-2011-0051023 A 5/2011

* cited by examiner

*Primary Examiner* — Nguyen T Vo
(74) *Attorney, Agent, or Firm* — Mintz Levin Cohn Ferris Glovsky and Popeo, P.C.; Peter F. Corless

(57) ABSTRACT

A vehicle including an antenna that receives a first signal and a second signal having different operating frequency bands is provided. An amplifying part of the antenna includes a first amplifier configured to amplify the first signal and a second amplifier configured to amplify the second signal. A receiving part includes a first tuner configured to tune the first signal amplified by the amplifying part and a second tuner configured to tune the second signal amplified by the amplifying part. A first switch connects the antenna to the first amplifier or the second amplifier, a second switch connects the amplifying part to the first tuner or the second tuner, an input part receives a channel from a user, and a controller individually operates the first switch and the second switch based on an operating frequency band of the received channel.

20 Claims, 10 Drawing Sheets

VEHICLE, METHOD OF CONTROLLING THE SAME, AND ANTENNA FOR VEHICLE

CROSS-REFERENCE TO RELATED APPLICATION

This application is based on and claims priority under 35 U.S.C. § 119 to Korean Patent Application No. 10-2019-0041937, filed on Apr. 10, 2019, the disclosure of which is incorporated herein by reference.

BACKGROUND

1. Field of the Disclosure

The present disclosure relates to a vehicle, a method of controlling the vehicle, a receiving apparatus for the vehicle, and an antenna apparatus for the vehicle. An operating frequency band available for reception of the antenna is changed based on an operating frequency band of a channel input from a user.

2. Description of the Related Art

Generally, a vehicle refers to a device for movement or transportation, designed to travel on a road or railway using fossil fuel, electric power, and the like as a power source. The vehicle is a transportation device and may be a living space that provides rest to the driver. In addition, various vehicle electronic devices are installed within the vehicle to provide comfort and rest to the driver.

In addition, the vehicle includes an antenna for receiving radio waves for radio broadcast reception and the like. The vehicle antenna may be provided separately for each reception channel or may operate by splitting a received signal using a duplexer. However, when the duplexer is used, an amplitude modulation (AM) signal may leak into a path of a frequency modulation (FM) amplifier, and an FM signal may leak into a path of an AM amplifier, which causes signal loss and signal interference, degrading the signal quality. In addition, to use a separate antenna for each reception channel, at least two antennas and at least two feeder cables are required.

SUMMARY

The present disclosure provides a vehicle configured to change an operating frequency band available for reception by an antenna by operating a plurality of switches based on an operating frequency band of a channel input from a user. A signal reception path may be changed from the antenna to a tuner. The present disclosure also provides a method of controlling the vehicle, and a receiving apparatus for the vehicle. Additional features are set forth in part in the description which follows, may be evident, at least in part, from the description, and may be learned by practice.

In accordance with one exemplary embodiment of the present disclosure, a vehicle may include an antenna configured to receive a first signal and a second signal having different operating frequency bands and an amplifying part having a first amplifier configured to amplify the first signal and a second amplifier configured to amplify the second signal. The vehicle may also include a receiving part having a first tuner configured to tune the first signal amplified by the amplifying part and a second tuner configured to tune the second signal amplified by the amplifying part. A first switch may connect the antenna to the first amplifier or the second amplifier and a second switch may connect the amplifying part to the first tuner or the second tuner. An input part configured to receive a channel from a user and a controller may be configured to individually operate the first switch and the second switch based on an operating frequency band of the received channel.

The controller may be configured to operate the first switch to connect the first amplifier to the antenna when a signal having the operating frequency band of the received channel is the first signal. The controller may be configured to operate the second switch to connect the first tuner to the amplifying part when a signal having the operating frequency band of the received channel is the first signal.

The antenna may include a conductor configured to receive the first signal and the second signal and a third switch configured to adjust an operating frequency band of the conductor. The controller may be configured to operate the third switch for the antenna to receive the first signal when a signal having the operating frequency band of the received channel is the first signal.

The first amplifier may include a plurality of inductors and a fourth switch. The controller may be configured to operate the fourth switch to change an impedance of the first amplifier based on reception strength of the first signal received from the antenna. The third switch may be connectable to the conductor at a plurality of contact points. The controller may be configured to operate the third switch to vary the contact point of the third switch and the conductor. The fourth switch may connect one of the plurality of inductors to the antenna, and the controller may connect the fourth switch to one of the plurality of inductors. The impedance of the first amplifier may be changed based on the reception strength of the first signal received from the antenna.

Each of the first signal and the second signal may correspond to at least one a frequency modulation (FM) signal, an amplitude modulation (AM) signal, a digital multimedia broadcasting (DMB) signal, a digital audio broadcasting (DAB) signal, and integrated services digital broadcasting-terrestrial (ISDB-T) signal. Each of the first amplifier and the second amplifier may be designed to amplify at least one of a frequency modulation (FM) signal, an amplitude modulation (AM) signal, a digital multimedia broadcasting (DMB) signal, a digital audio broadcasting (DAB) signal, and integrated services digital broadcasting-terrestrial (ISDB-T) signal.

In accordance with another exemplary embodiment of the present disclosure, a method of controlling a vehicle may include receiving a channel from a user, determining an operating frequency band based on the received channel, and individually operating a first switch configured to connect an antenna to a first amplifier or a second amplifier and a second switch configured to connect an amplifying part including the first amplifier and the second amplifier to a first tuner or a second tuner based on the determined operating frequency band.

The method may further include operating the first switch to connect the first amplifier to the antenna when a signal having the determined operating frequency band is a first signal. Additionally, the method may include operating the second switch to connect the first tuner to the amplifying part when a signal having the determined operating frequency band is a first signal. The method may further include operating a third switch for the antenna to receive a first signal when a signal having the determined operating frequency band is the first signal. The method may further include operating a fourth switch to change an impedance of the first amplifier based on reception strength of a first signal received from the antenna.

The operation of the third switch for the antenna to receive the first signal may include operating the third switch to vary a contact point of the third switch and a conductor included in the antenna. The operation of the fourth switch to change the impedance of the first amplifier based on the reception strength of the first signal received from the antenna may include connecting the fourth switch to one of a plurality of inductors included in the first amplifier based on the reception strength of the first signal received from the antenna.

In accordance with another exemplary embodiment of the present disclosure, an antenna apparatus may include an antenna configured to receive a first signal and a second signal having different operating frequency bands. The antenna apparatus may include an amplifying part having a first amplifier configured to amplify the first signal and a second amplifier configured to amplify the second signal. The antenna apparatus may also include a receiving part having a first tuner configured to tune the first signal amplified by the amplifying part and a second tuner configured to tune the second signal amplified by the amplifying part. The antenna apparatus may include a first switch configured to connect the antenna to the first amplifier or the second amplifier, a second switch configured to connect the amplifying part to the first tuner or the second tuner and a controller configured to individually operate the first switch and the second switch based on a channel selected by a user.

The controller may be configured to operate the first switch to connect the first amplifier to the antenna when a signal having an operating frequency band of the selected channel is the first signal. The controller may be configured to operate the second switch to connect the first tuner to the amplifying part when a signal having an operating frequency band of the selected channel is the first signal. The antenna may include a conductor configured to receive the first signal and the second signal and a third switch configured to adjust an operating frequency band of the conductor. The controller may be configured to operate the third switch for the antenna to receive the first signal when a signal having an operating frequency band of the selected channel is the first signal.

The first amplifier may include a plurality of inductors and a fourth switch. The controller may be configured to operate the fourth switch to change an impedance of the first amplifier based on reception strength of the first signal received from the antenna. The third switch may be connectable to the conductor at a plurality of contact points. The controller may be configured to operate the third switch to vary the contact point of the third switch and the conductor. The fourth switch may connect one of the plurality of inductors to the antenna, and the controller may connect the fourth switch to one of the plurality of inductors to change the impedance of the first amplifier based on the reception strength of the first signal received from the antenna.

BRIEF DESCRIPTION OF THE DRAWINGS

These and/or other features of the disclosure will become apparent and more readily appreciated from the following description of the exemplary embodiments, taken in conjunction with the accompanying drawings of which.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like numerals refer to like elements throughout the specification. Not all elements of exemplary embodiments of the present disclosure will be described, and description of what are commonly known in the art or what overlap each other in the exemplary embodiments will be omitted. The terms as used throughout the specification, such as "~part", "~module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

Further, when it is stated that a member is "on" another member, the member may be directly on the other member or a third member may be disposed therebetween.

Although the terms "first," "second," "A," "B," etc. may be used to describe various components, the terms do not limit the corresponding components, but are used only for the purpose of distinguishing one component from another component.

Reference numerals used for method steps are just used for convenience of explanation, but not to limit an order of the steps. Thus, unless the context clearly dictates otherwise, the written order may be practiced otherwise.

Although at least one exemplary embodiment is described as using a plurality of units to perform the exemplary process, it is understood that the exemplary processes may also be performed by one or plurality of modules. Additionally, it is understood that the term controller/control unit may refer to a hardware device that includes a memory and a processor. The memory may be configured to store the modules and the processor may be specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

In particular, the operating principles and exemplary embodiments of the disclosure will be described with reference to the accompanying drawings.

Figure 1:
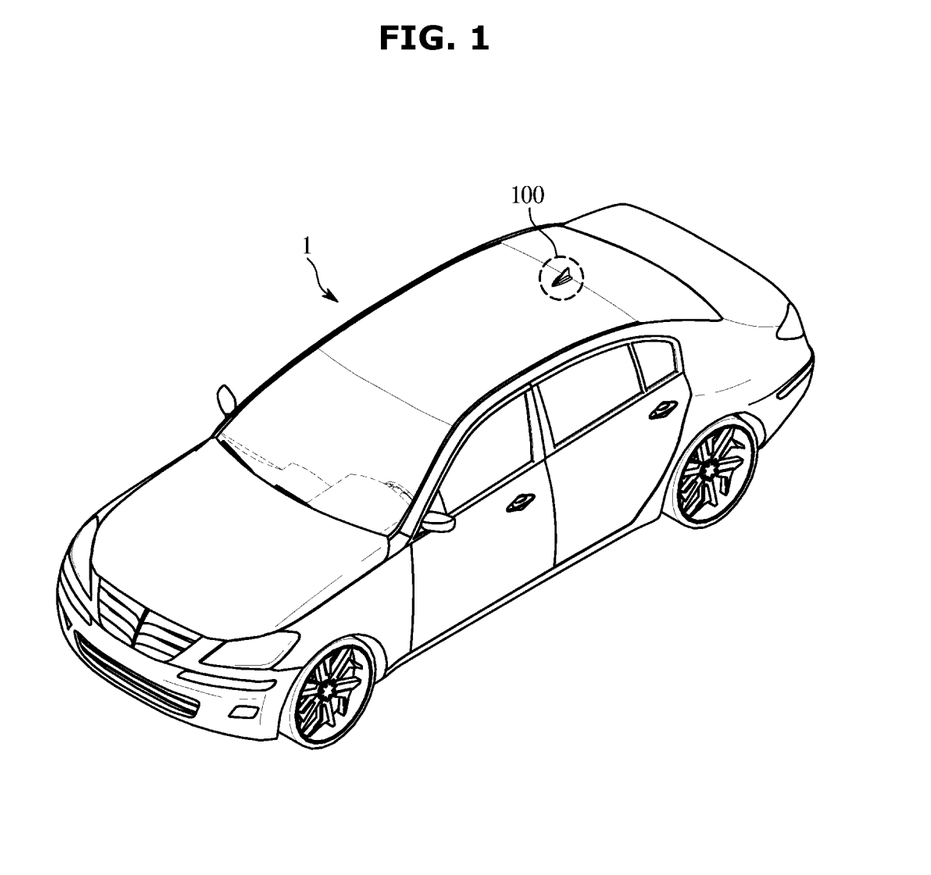
FIG. 1 is a diagram illustrating a vehicle according to an exemplary embodiment.
Figure 2:
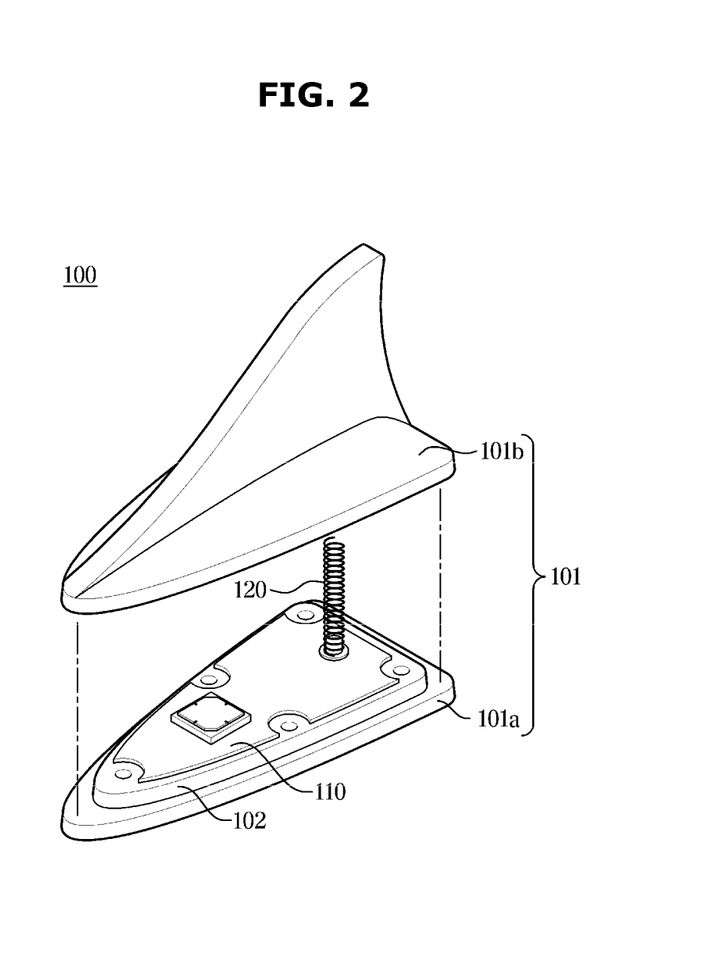
FIG. 2 is a diagram illustrating a structure of an antenna apparatus according to an exemplary embodiment.

FIG. 1 is a diagram illustrating a vehicle 1 according to an exemplary embodiment. FIG. 2 is a diagram illustrating a structure of an antenna apparatus according to an exemplary embodiment.

Referring to FIGS. 1 and 2, the vehicle 1 according to the exemplary embodiment may include a body that forms the external appearance of the vehicle 1 and accommodates a driver and/or baggage, a chassis that includes components of the vehicle 1 except for the body, and electrical components that protect the driver or provide the driver with comfort. The body may form an interior space for the driver, an engine room for accommodating an engine, and a trunk room for accommodating cargo. The chassis may include devices for generating power used to run the vehicle 1 under the operation of the driver and for travelling, braking and/or steering the vehicle 1 using the power. Electrical components may control the vehicle 1, and may provide the driver and passenger with safety and comfort.

A roof panel of the vehicle 1 may include an antenna apparatus 100 for receiving wireless signals, such as radio signals, broadcasting signals, satellite signals, and the like, and transmitting and receiving signals to and from other vehicles, servers, and base stations. The antenna apparatus 100 may include a housing 101 having a bottom member 101a mounted to the roof panel of the vehicle 1 and a cover member 101b coupled to the bottom member 101a and covering internal components of the antenna apparatus 100. The housing 101 may have a shark fin shape.

The bottom member 101a may include a synthetic resin attached to the body to prevent foreign substances from being introduced between the bottom member 101a and the cover member 101b. The bottom member 101a may mitigate the impact of vibrations or signals transmitted from the body. The bottom member 101a may be provided at the rear upper side of the vehicle 1 to reduce interference with peripheral components while increasing the reception rate of radio signals. In addition, the bottom member 101a has a cross section gradually increasing in a direction toward the rear side to reduce wind resistance and noise generated at a time of movement of the body.

The antenna apparatus 100 may include a base member 102 disposed on the bottom member 101a and a receiving module 110 disposed on the base member 102. The base member 102 may be coupled to the bottom member 101a by bonding, bolting, or similar coupling techniques, and may be coupled to the receiving module 110 by bolting. The base member 102 may provide a space for mounting the receiving module 110 and the antennas 120 thereon.

The receiving module 110 may be provided using a printed circuit board (PCB) including interconnections formed by etching copper or the like on a substrate. The receiving module 110 may include an aperture which a wire passes through. The receiving module 110 may include a signal processing circuit for performing signal processing by amplifying or filtering a signal received by the antenna 120. The receiving module 110 may be configured to transmit a signal to an electronic control unit (ECU) or a terminal mounted inside the body. The receiving module 110 may be configured to extract a signal of a preset frequency band, for example, an analog signal, such as a frequency modulation (FM) signal and an amplitude modulation (AM) signal, and a digital signal, such as a digital multimedia broadcasting (DMB) signal, a digital audio broadcasting (DAB) signal, and integrated services digital broadcasting-terrestrial (ISDB-T) signal, and optimize the extracted signal. The receiving module 110 may be implemented as a single integrated receiving module by mounting components, such as a band pass filter (BPF), a switch, a tuner, a buffer, and a digital signal processor (DSP), on a circuit board.

The antenna 120 may be provided in one or more units thereof, and may be mounted on the receiving module 110. The antenna 120 may refer to an antenna that receives a signal having a certain frequency band as a signal of a fundamental frequency band. The certain frequency band may include an FM band, an AM band, a DMB (or DAB, ISDB-T) band, and other various frequency bands of broadcast signals. However, as will be described below with reference to FIG. 5, the controller 130 may be configured to operate a switch 122 to change the operating frequency band available for reception by the antenna 120. The antenna 120 may be mounted on the receiving module 110 and configured to transmit the received signal to the receiving module 110. The antenna 120 may be implemented using a coil antenna, but the present disclosure is not limited thereto and various other antennas, such as a chip antenna and a microstrip patch antenna may be used.

Figure 3:
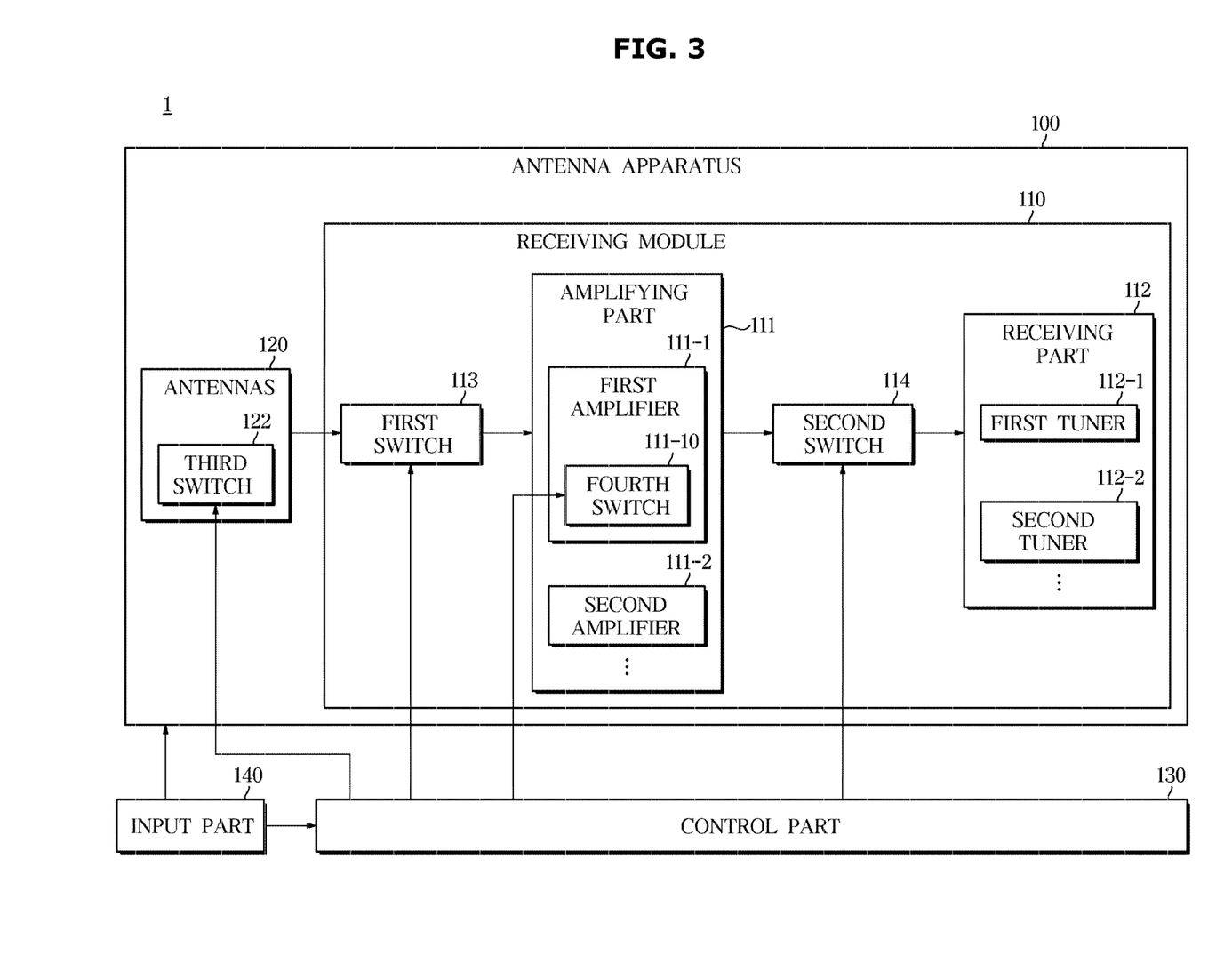
FIG. 3 is a block diagram illustrating a configuration of a vehicle and an antenna apparatus according to an exemplary embodiment.

FIG. 3 is a block diagram illustrating an antenna apparatus according to an exemplary embodiment. The antenna apparatus 100 may include the receiving module 110 and the antenna 120. The receiving module 110 may include: a first switch 113; an amplifying part 111 having a first amplifier 111-1 including a fourth switch 111-10 and a second amplifier 111-2; a second switch 114; and a receiving part 112 having a first tuner 112-1 and a second tuner 112-2. Although not shown, the controller 130 may be included in the receiving module 110. In addition, although not shown, the receiving module 110 may further include a filter for extracting only a signal having a predetermined operating frequency band among signals received from the antenna 120, and each filter may be included in the amplifying part 111.

The amplifying part 111 may be configured to amplify a signal received from the antenna 120, and may include the first amplifier 111-1 and the second amplifier 111-2 configured to amplify signals of different preset operating frequency bands. Although only the first amplifier 111-1 and the second amplifier 111-2 are shown in the drawing, the amplifying part 111 may further include another amplifier, for example, a third amplifier 111-3 (see FIG. 4) to perform additional functions. For example, the first amplifier 111-1 may be configured to amplify an AM signal, the second amplifier 111-2 may be configured to amplify an FM signal, and the third amplifier 111-3 may be configured to amplify a DMB (or DAB, ISDB-T) signal, but the present disclosure is not limited thereto.

The receiving part 112 may be configured to tune to a channel received from a user to extract a signal of the selected frequency. In other words, the receiving part 112 may include the first tuner 112-1 and the second tuner 112-2 for tuning signals of different preset operating frequency bands. The first tuner 112-1 and the second tuner 112-2 included in the receiving part 112 may provide a signal of a channel input from a user to the audio system of the vehicle 1 as an acoustic signal. Each tuner may tune to a frequency selected via the audio system of the vehicle 1. Although not shown, the receiving part 122 may further include another tuner (e.g., a third tuner) to perform additional functions, as well as the first tuner 112-1 and the second tuner 112-2 shown in the drawing. In particular, for example, the first tuner 112-1 may be configured to tune an AM signal and an FM signal, the second tuner 112-2 may be configured to tune a DMB signal, and the third tuner may be configured to tune a DAB (or ISDB-T) signal, but the present disclosure is not limited thereto. The signal extracted from the receiving part 112 may be transmitted to the audio system of the vehicle 1, and the audio system may transmit the received signal as sound.

As will be described below with reference to FIGS. 4 to 9, the controller 130 may be configured to individually operate a plurality of switches based on the operating frequency band of a channel received from an input part 140. In particular, the plurality of switches may include at least one of a switch for connecting the antenna 120 to the first amplifier 111-1 or the second amplifier 111-2 (hereinafter referred to as a "first switch"), a switch that connects the amplifying part 111 to the first tuner 112-1 or the second tuner 112-2 (hereinafter referred to as a "second switch"), a switch configured to adjust the operating frequency band of a conductor 121 included in the antenna 120 (hereinafter referred to as a "third switch"), and a switch configured to change the impedance of the first amplifier 111-1 by changing by changing an element value of the first amplifier 111-1 (hereinafter referred to as a "fourth switch").

In other words, the first switch 113 may connect one of the plurality of amplifiers 111-1 to 111-3 to the antenna 120 under the operation of the controller 130, the second switch 114 may connect one of the plurality of tuners 112-1 and 112-2 to the amplifying part 111 under the control of the controller 130, the third switch 122 may be connectable to the conductor 121 at a plurality of contact points to vary the contact point under the operation of the controller 130, and the fourth switch 111-10 may connect one of a plurality of inductors 111-11 to the antenna 120 under the operation of the controller 130.

Although the controller 130 is illustrated as included in the vehicle 1, the controller 130 may be included in the antenna apparatus 100. A detailed control process of the controller 130 of the vehicle 1 or the antenna apparatus 100 will be described below with reference to FIGS. 4 to 9. The controller 130 may be configured to generate various control signals for operating the components in the antenna apparatus 100. The controller 130 may be implemented as a module separated from the receiving module 110 or a module integrated with an ECU of the vehicle 1.

The controller 130 may include a memory (not shown) configured to store data regarding an algorithm for executing the operations of the components of the vehicle 100 or a program that represents the algorithm, and a processor (not shown) that performs the above described operations using the data stored in the memory. In particular, the memory and the processor may be implemented as separate chips. Alternatively, the memory and the processor may be implemented as a single chip. The controller 130 may be configured to transmit a signal to an ECU or a terminal. In particular, the signal may be transmitted using a controller area network (CAN) communication scheme. In addition, the controller 130 may be configured to receive a command input from the input part 140 by various receiving methods, such as CAN communication.

For example, when the input part 140 receives a channel selection from the user, the controller 130 may be configured to receive the input channel, and individually operate the plurality of switches 113, 114, 122, and 111-10 based on the operating frequency band of the input channel. The input part 140 may be provided in the vehicle 1 to receive various commands related to the vehicle 1. For example, the input part 140 may be implemented using a physical button, a knob, a touch pad, a touch screen, a stick-type manipulation device or a track ball provided in the vehicle 1. The user may control various operations of the vehicle 1 by manipulating the input part 140. For example, the input part 140 may be configured to receive a reception channel selection from a user. In addition, the input part 140 may be configured to transmit the received command to the controller 130 by various transmission methods, such as CAN communication.

Figure 4:
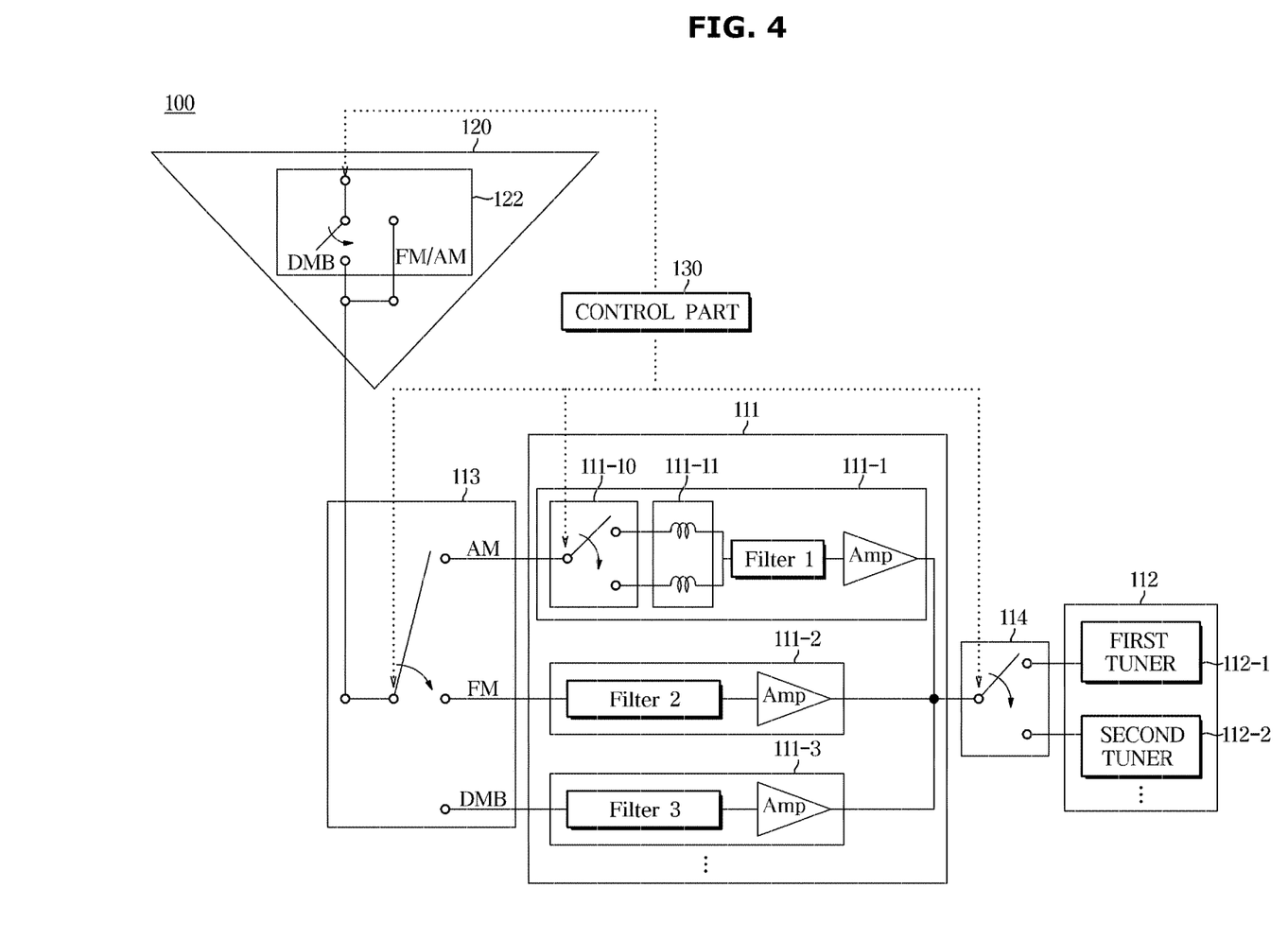
FIG. 4 is a diagram illustrating a detailed configuration of an antenna apparatus according to an exemplary embodiment.

FIG. 4 is a diagram illustrating a detailed configuration of an antenna apparatus according to an exemplary embodiment. Referring to FIG. 4, the antenna 120 according to the exemplary embodiment may be configured to receive a plurality of signals having different operating frequency bands. For example, the plurality of signals may include a first signal and a second signal, in which the first signal may be an AM signal and the second signal may be an FM signal, or the first signal may be an FM signal and the second signal may be a DMB (or DAB, ISDB-T) signal. In other words, the first signal and the second signal may refer to all types of signals having different operating frequency bands regardless of the terms thereof.

The antenna 120 may include the conductor 121 be configured to receive the first signal and the second signal and the third switch 122 for adjusting an operating frequency band of the conductor 121 as will be described below with reference to FIG. 5. The controller 130 may be configured to operate the third switch 122 for the antenna 120 to receive the first signal when a signal having an operating frequency band of a channel received from the input part 140 is the first signal. For example, when a signal having an operating frequency band of an input channel is an FM signal, the antenna 120 may be configured to control the third switch 122 for the antenna 120 to receive the FM signal.

In particular, the first signal received from the antenna 120 may pass via the first switch 113 and reach the first amplifier 111-1 or the second amplifier 111-2. When a signal having the operating frequency band of the input channel is the first signal, the controller 130 may be configured to operate the first switch 113 to connect the first amplifier 111-1 to the antenna 120. For example, when a signal having the operating frequency band of the input channel is an AM signal, the controller 130 may be configured to operate the first switch 113 to connect the first amplifier 111-1 (designed to amplify an AM signal) to the antenna 120.

For the sake of convenience in description, the first amplifier 111-1 is illustrated as an amplifier for amplifying an AM signal, but the present disclosure is not limited thereto. For example, the first amplifier 111-1 may be an amplifier for amplifying a signal having a different operating frequency band, such as an FM signal or a DMB (or DAB, ISDB-T) signal. In other words, the signal amplified by the amplifier is not limited to the terms such as the first amplifier 111-1 and the second amplifier 111-2.

The amplifying part 111 may include a plurality of amplifiers, and for the sake of convenience in description, it may be assumed that the first amplifier 111-1 is an amplifier for amplifying an AM signal, the second amplifier 111-2 is an amplifier for amplifying an FM signal, the third amplifier 111-3 is an amplifier for amplifying a DMB (or DAB, ISDB-T) signal. In particular, each of the plurality of amplifiers may include a plurality of inductors 111-11 and a fourth switch 111-10, and the controller 130 may be configured to operate the fourth switch 111-10 to change the impedance of the amplifier that amplifies the received signal based on the reception strength of the signal received from the antenna 120. As will be described below with reference to FIG. 6, the fourth switch 111-10 connects one of a plurality of inductors 111-11 to the antenna 120, and the controller 130 may connect the fourth switch 111-10 to one of the plurality of inductors 111-11 based on the reception strength of the signal received from the antenna 120.

The receiving part 112 may include a plurality of tuners. For the sake of convenience in description, it may be assumed that the first tuner 112-1 is a tuner for tuning an AM signal or an FM signal, and the second tuner 112-2 is a tuner for tuning a DMB (or DAB, ISDB-T) signal. However, the present disclosure is not limited thereto, and the first tuner 112-1 may be a tuner for tuning a signal having a different operating frequency band, such as a DMB signal (or DAB, ISDB-T). In other words, the signal tuned by the tuner is not limited to the terms thereof, such as the first tuner 112-1 and the second tuner 112-2.

In particular, when a signal having the operating frequency band of the input channel is the first signal, the controller 130 may be configured to operate the second switch 114 to connect the amplifying part 111 to the first tuner 112-1 that tunes the first signal amplified by the amplifying part 111. For example, when a signal having the operating frequency band of the input channel is a DMB (or DAB, ISDB-T) signal, the controller 130 may be configured to operate the second switch 114 to connect the amplifying part 111 to the first tuner 112-1 that amplifies a DMB (or DAB, ISDB-T) signal amplified by the amplifying part 111.

Figure 5:
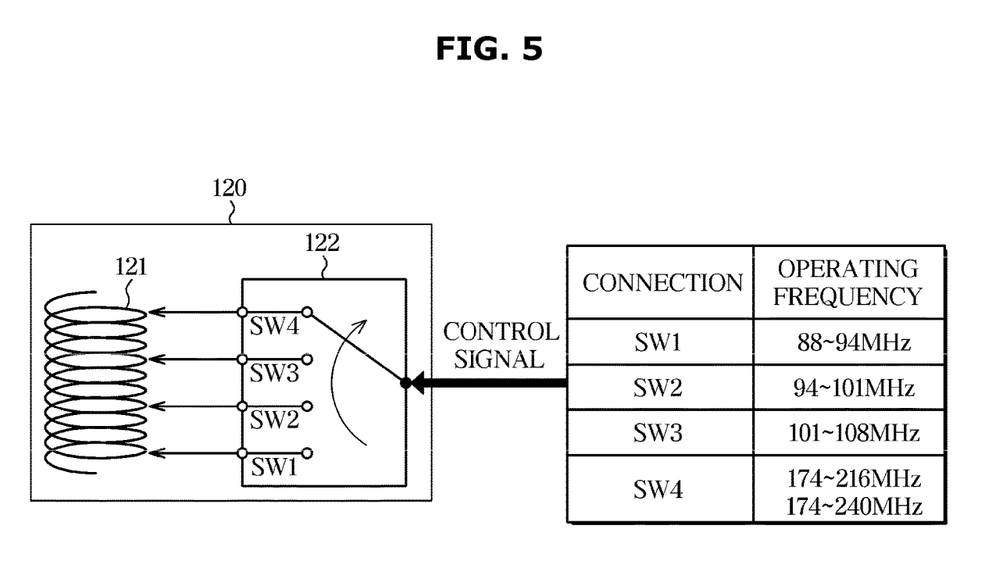
FIG. 5 is a diagram illustrating a conductor and a switch included in an antenna according to an exemplary embodiment.

FIG. 5 is a diagram illustrating the conductor 121 and the switch included in the antenna 120 according to the exemplary embodiment. Referring to FIG. 5, the antenna 120 according to the exemplary embodiment may include the conductor 121 configured to receive first and second signals having different operating frequency bands and the third switch 122 configured to adjust the operating frequency band of the conductor 121. In particular, the conductor 121 may be provided in the form of a coil, but the present disclosure is not limited thereto. When a signal having the operating frequency band of the input channel is the first signal, the controller 130 may be configured to operate the third switch 122 for the antenna 120 to receive the first signal.

For example, when the controller 130 may be configured to operate the third switch 122 to be positioned at a SW1 point, the operating frequency band may be in a range of about 88 MHz or more but less than about 94 MHz, in which the antenna 120 operates as an antenna for receiving a frequency band of AM signals 1 or an antenna for receiving a low frequency band of FM signals. When the third switch 122 is operated to be positioned at a SW2 point, the operating range of the conductor 121 is reduced, resulting in the operating frequency band of about 94 MHz or more but less than about 101 MHz, in which the antenna 120 may operate as an antenna for receiving an intermediate frequency band of FM signals. When the third switch 122 is operated to be positioned at a SW3 point, the operating range of the conductor 121 is further reduced, resulting in the operating frequency band of about 101 MHz or more but less than about 108 MHz, in which the antenna 120 may operate as an antenna for receiving a high frequency band of FM signals.

When the third switch 122 is operated to be positioned at a SW4 point, the operating range of the conductor 121 is further reduced, resulting in the operating frequency band of about 174 MHz or more but less than about 216 MHz, or of about 174 MHz or more but less than about 240 MHz. Since the operating frequency band for DMB signals is in a range of about 174 MHz to about 216 MHz, and the operating frequency band for DAB signals and ISDB-T signals is in a range of about 174 MHz to about 240 MHz, when the third switch 122 is positioned at the SW4 point, the antenna 120 may operate as an antenna for receiving the frequency band of the DMB (or DAB, ISDB-T) signal. For example, when the operating frequency band of the input channel corresponds to about 99 MHz, the controller 130 may be configured to operate the third switch 122 positioned at the SW3 point for the antenna 120 to receive the first signal having an operating frequency band of about 99 MHz.

Accordingly, when the operating frequency band of the channel input by the vehicle 1 is changed, the vehicle 1 may automatically determine the reception frequency of the signal and change the frequency characteristic of the antenna apparatus 100. In this manner, the controller 130 may flexibly adjust the operating frequency band of the antenna 120 to improve the signal-to-noise ratio (SNR) compared to the conventional antenna apparatus.

In the above-described exemplary embodiment, the operating frequency band is described as divided into four operating frequency bands by the controller 130 and the third switch 122, but the number of operating frequency bands is not limited thereto.

Figure 6:
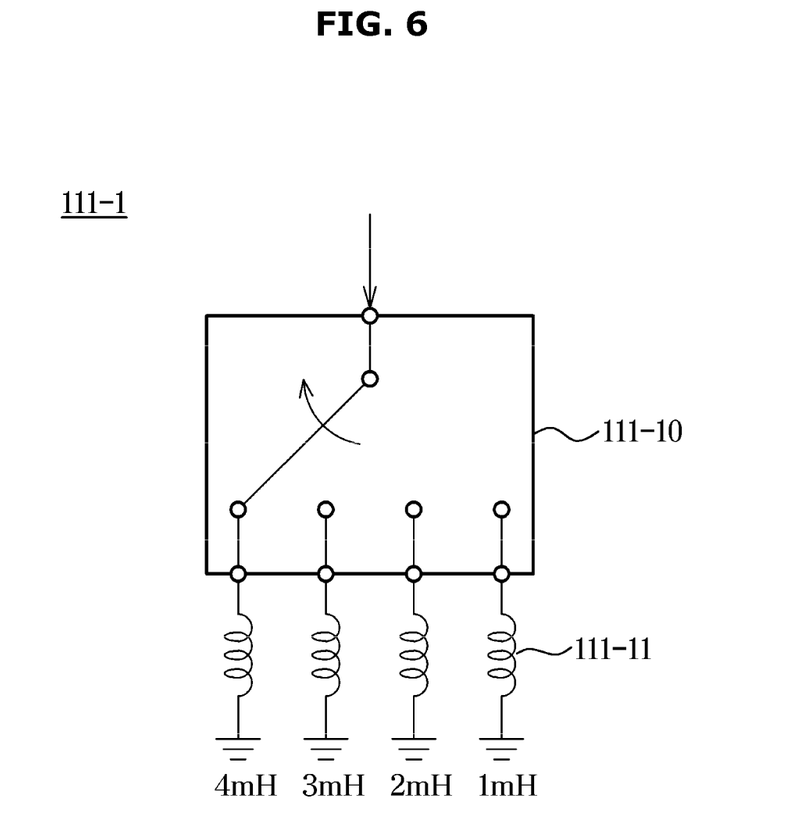
FIG. 6 is a diagram illustrating an inductor and a switch included in an amplifier according to an exemplary embodiment.

FIG. 6 is a diagram illustrating an inductor and a switch included in an amplifier according to an exemplary embodiment. Referring to FIG. 6, the amplifier according to the exemplary embodiment may include the plurality of inductors 111-11 and the fourth switch 111-10. For the sake of convenience in description, the first amplifier 111-1 is illustrated as an example of the amplifier, but the present disclosure is not limited thereto. Although the plurality of inductors 111-11 are illustrated as four inductors 111-11 each having a predetermined inductance value, the inductance value or the number of inductors is not limited thereto.

The first amplifier 111-1 may include the plurality of inductors 111-11 and the fourth switch 111-10, and the controller 130 may be configured to operate the fourth switch 111-10 to change the impedance of the first amplifier 111-1 based on the reception strength of the first signal received from the antenna 120. In other words, the fourth switch 111-10 connects one of the plurality of inductors 111-11 to the antenna 120, and the controller 130 connects the fourth switch 111-10 to one of the plurality of inductors 111-11 to change the impedance of the first amplifier 111-1 based on the reception strength of the first signal received from the antenna 120.

In particular, the controller 130 may be configured to change the impedance of the first amplifier 111-1 based on the operating frequency band of the input channel. For example, in the entire operating frequency band available for operation of the antenna 120, of about 500 kHz or more but less than about 1700 kHz, when the impedance of the antenna 120 is R+jX, the ideal impedance of the first amplifier 111-1 for impedance matching (hereinafter, "impedance matching region") needs to be a conjugate complex value R−jX. In other words, the controller 130 may be configured to change the impedance of the first amplifier 111-1 within an impedance variation range of the first amplifier 111-1 and a region corresponding to the operating frequency band of a channel input from a user may become the impedance matching region. In particular, the reception paths when the signal of the operating frequency band of the channel input from the user is the FM signal, the AM signal, or the DMB (or DAB, ISDB-T) signal will be described with reference to FIGS. 7 to 9.

Figure 7:
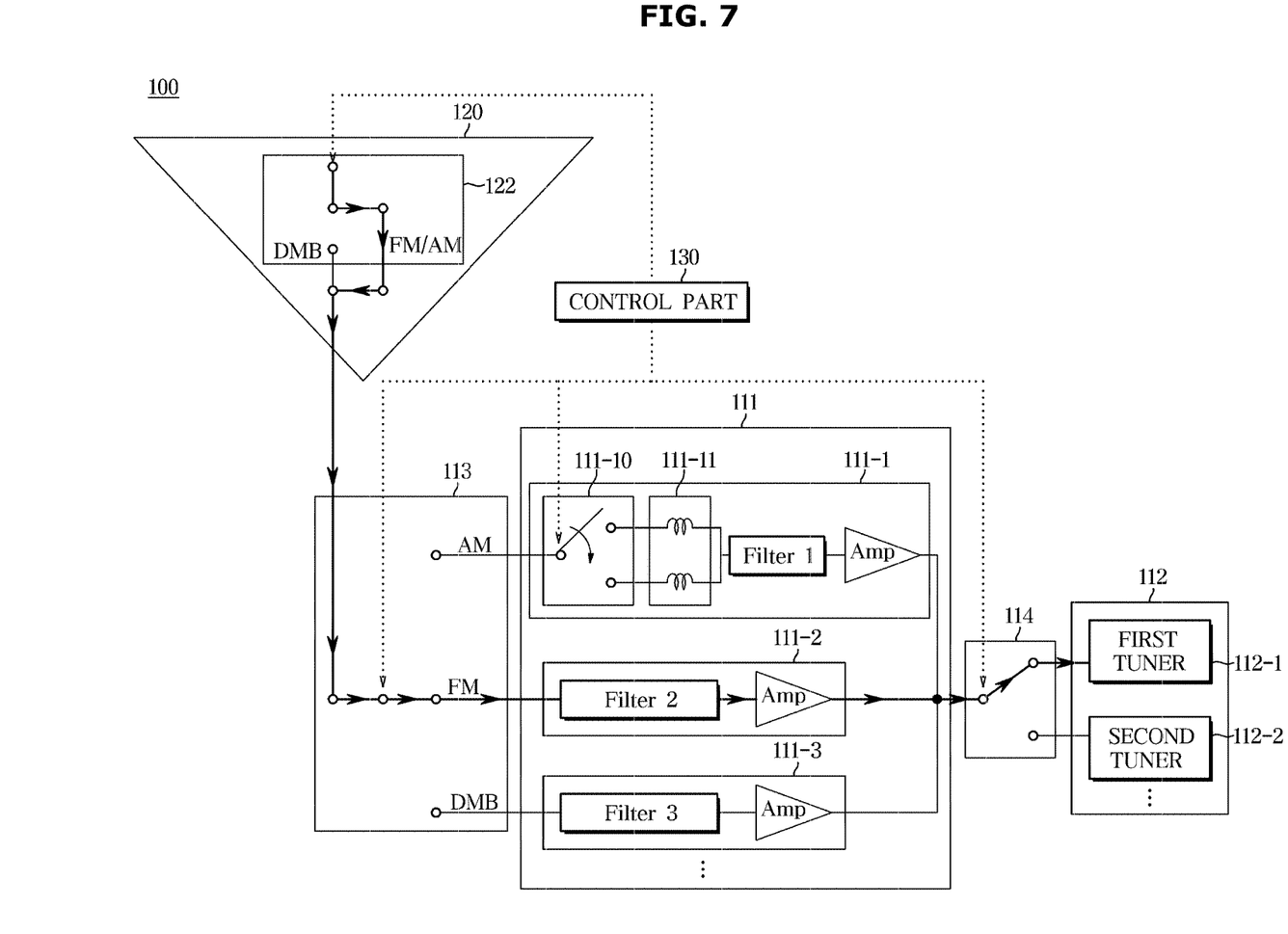
FIG. 7 is a diagram illustrating a reception path when a received signal is an FM signal according to an exemplary embodiment.
Figure 8:
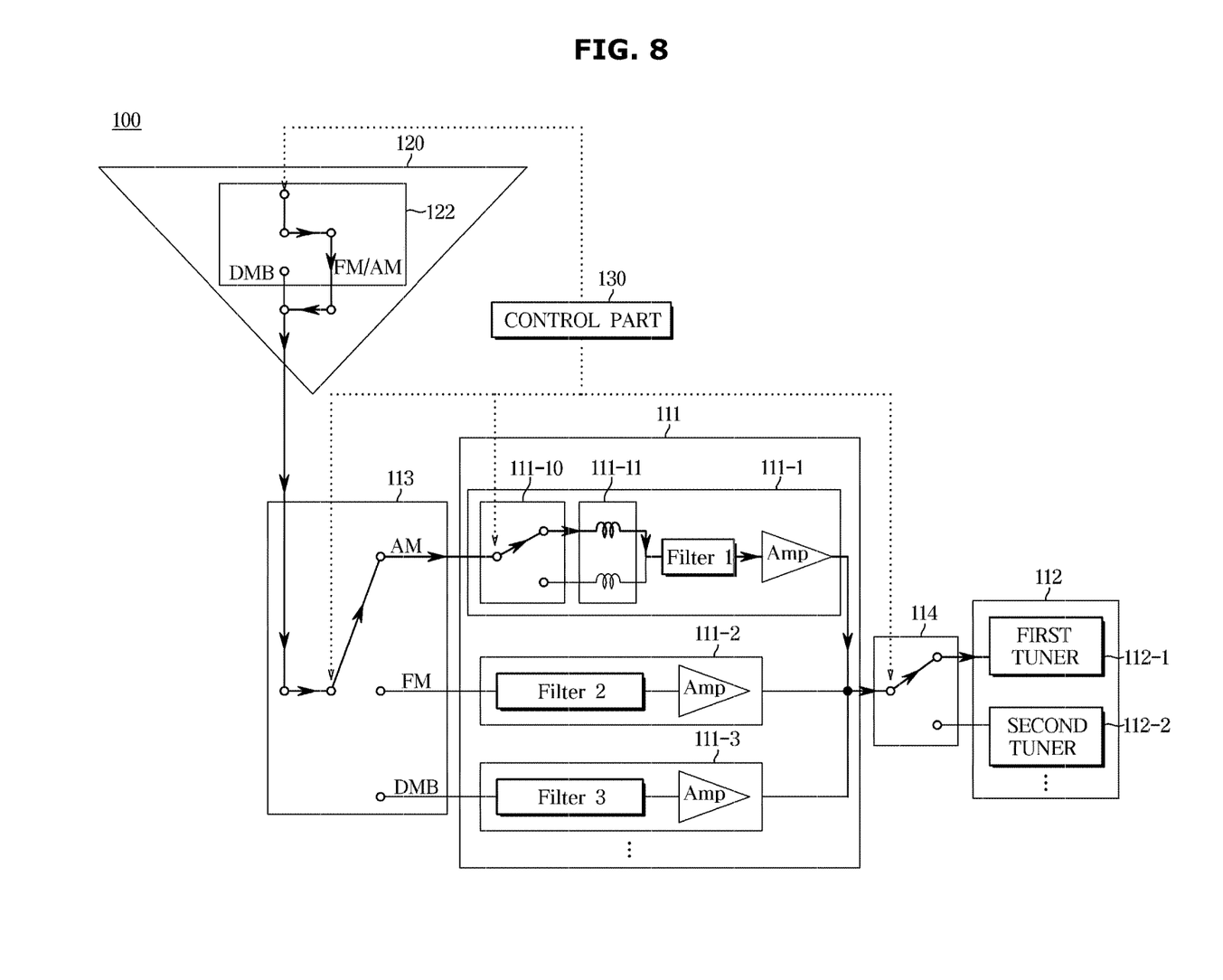
FIG. 8 is a diagram illustrating a reception path when a received signal is an AM signal according to another exemplary embodiment.
Figure 9:
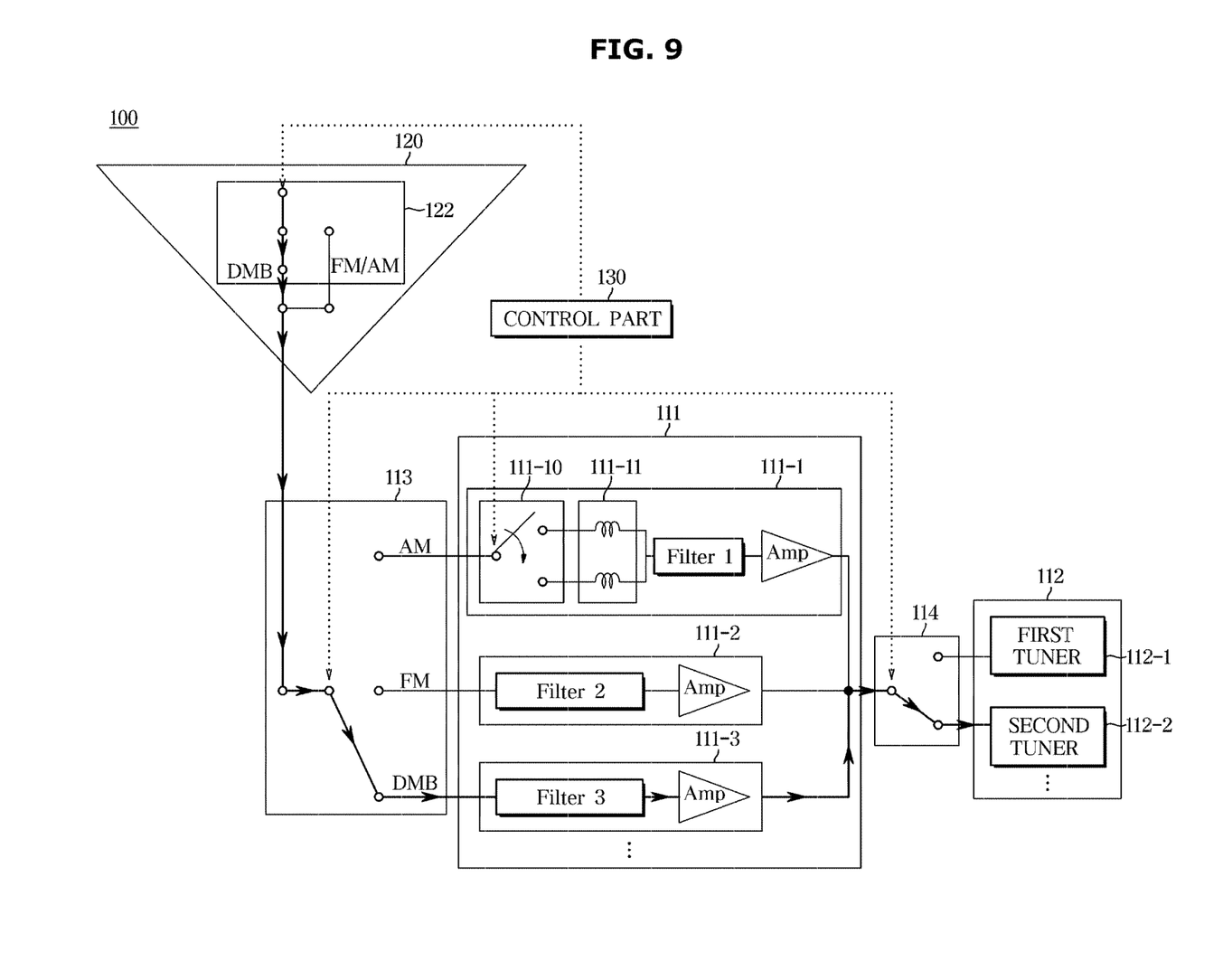
FIG. 9 a diagram illustrating a reception path when a received signal is a DMB (or DAB, ISDB-T) signal according to another exemplary embodiment.

FIG. 7 is a diagram illustrating a reception path when a received signal is an FM signal according to an exemplary embodiment. FIG. 8 is a diagram illustrating a reception path when a received signal is an AM signal according to another exemplary embodiment. FIG. 9 is a diagram illustrating a reception path when a received signal is a DMB (or DAB, ISDB-T) signal according to another exemplary embodiment.

Referring to FIG. 7, the controller 130 may be configured to determine whether a signal having an operating frequency of a channel input from a user is an FM signal based on the operating frequency band of the input channel. When the signal having the operating frequency band of the input channel is an FM signal, the controller 130 may be configured to operate the third switch 122 for the antenna 120 to receive the FM signal. In other words, the contact point of the conductor 121 included in the antenna 120 and the third switch 122 is changed to adjust the operating frequency band of the conductor 121 to receive the FM signal.

Accordingly, the antenna 120 may be configured to receive the FM signal, and the controller 130 may be configured to operate the first switch 113 to connect the antenna 120 to the second amplifier 111-2 designed to amplify the FM signal. Accordingly, the FM signal received from the antenna 120 may pass via the second amplifier 111-2. In addition, the controller 130 may be configured to operate the second switch 114 to connect the amplifying part 111 to the first tuner 112-1 designed to tune the amplified FM signal. Accordingly, the FM signal received from the antenna 120 may pass via the second amplifier 111-2 and reach the first tuner 112-1.

Referring to FIG. 8, the controller 130 may be configured to determine whether a signal having an operating frequency of a channel input from a user is an AM signal based on the operating frequency band of the input channel. When the signal having the operating frequency band of the input channel is an AM signal, the controller 130 may be configured to operate the third switch 122 for the antenna 120 to receive the AM signal. In other words, the contact point of the conductor 121 included in the antenna 120 and the third switch 122 is changed to adjust the operating frequency band of the conductor 121 to receive the AM signal.

Accordingly, the antenna 120 may receive the AM signal, and the controller 130 may be configured to operate the first switch 133 to connect the antenna 120 to the first amplifier 111-1 designed to amplify the AM signal. Accordingly, the AM signal received from the antenna 120 may pass via the first amplifier 111-1. In addition, the controller 130 may be configured to operate the fourth switch 111-10 to change the impedance of the first amplifier 111-1 based on the strength of the AM signal received from the antenna 120. For example, the controller 130 may allow the fourth switch 111-10 to be connected to the inductor 111-11 having an inductance of 2 mH to change the impedance of the first amplifier 111-1 based on the strength of the AM signal. In addition, the controller 130 may be configured to operate the second switch 114 to connect the amplifying part 111 to the first tuner 112-1 designed to tune the amplified AM signal. Accordingly, the AM signal received from the antenna 120 may pass via the first amplifier 111-1 and reach the first tuner 112-1.

Referring to FIG. 9, the controller 130 may be configured to determine whether a signal having an operating frequency of a channel input from a user is a DMB (or DAB, ISDB-T) signal based on the operating frequency band of the input channel. When the signal having the operating frequency band of the input channel is a DMB (or DAB, ISDB-T) signal, the controller 130 may be configured to operate the third switch 122 for the antenna 120 to receive the DMB (or DAB, ISDB-T) signal. In other words, the contact point of the conductor 121 included in the antenna 120 and the third switch 122 is changed to adjust the operating frequency band of the conductor 121 to receive a DMB (or DAB, ISDB-T) signal.

Accordingly, the antenna 120 may be configured to receive the DMB (or DAB, ISDB-T) signal, and the controller 130 may be configured to operate the first switch 113 to connect the antenna 120 to the third amplifier 111-3 designed to amplify the DMB (or DAB, ISDB-T) signal. Accordingly, the DMB signal received from the antenna 120 may pass via the third amplifier 111-3.

In addition, the controller 130 may be configured to operate the second switch 114 to connect the amplifying part 111 to the second tuner 112-2 designed to tune the amplified DMB (or DAB, ISDB-T) signal. Accordingly, the DMB (or DAB, ISDB-T) signal received from the antenna 120 may pass via the second amplifier 111-2 and reach the second tuner 112-2.

As described above, information regarding an input channel is transmitted to the controller 130. The controller 130 may be configured to operate a plurality of switches, so there is no need to provide the antenna 120 and the feeder cable in plural units. In addition, reception paths of signals having different operating frequency bands, such as AM signal, FM signal, and DMB (or DAB, ISDB-T), are set based on the operating frequency bands, and an undesired reception path is physical blocked to prevent signal loss and interference; therefore, the signal quality may be improved.

Figure 10:
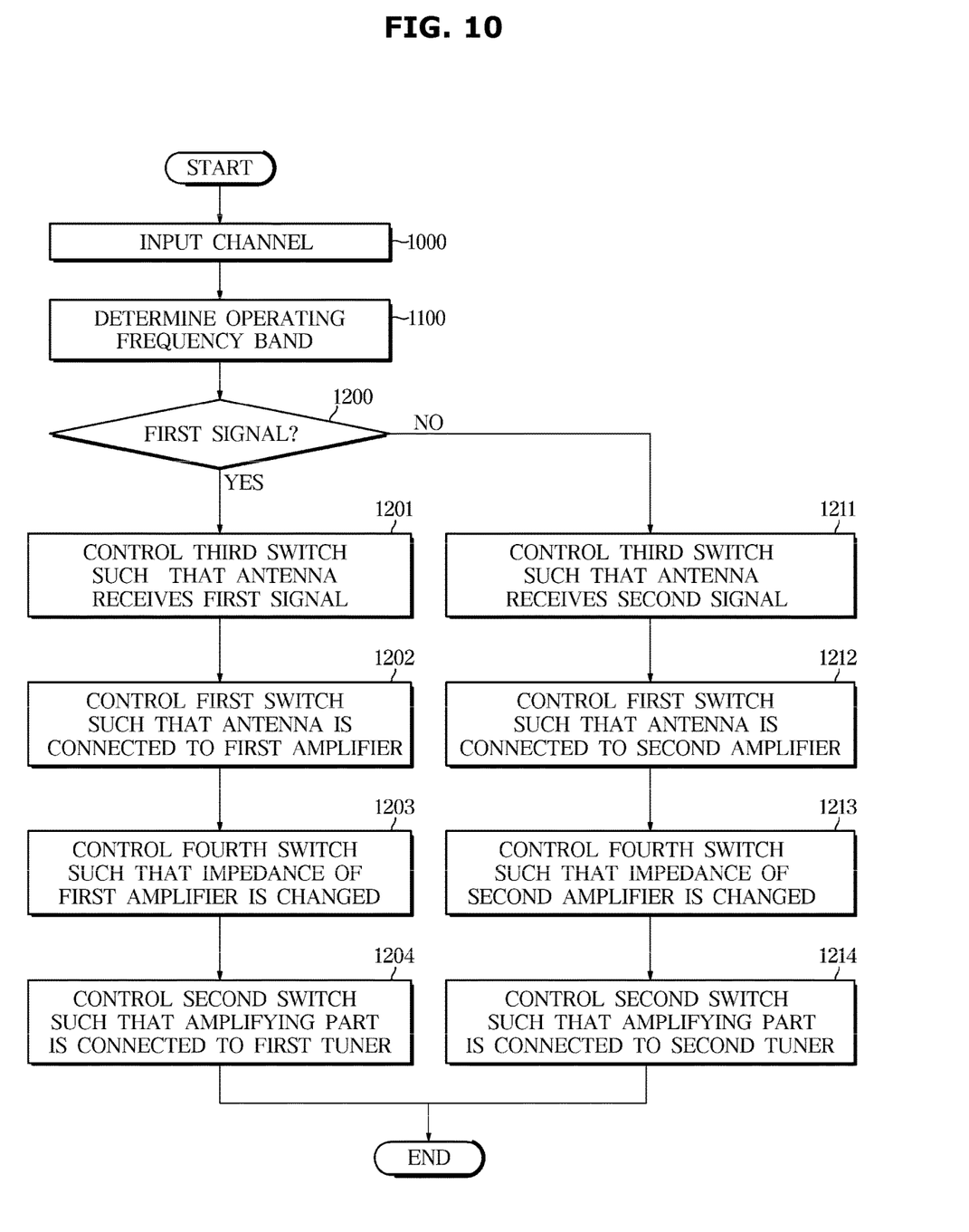
FIG. 10 is a flowchart showing a method of controlling a vehicle according to an exemplary embodiment.

In particular, a method of controlling the vehicle 1 according to an exemplary embodiment will be described with reference to FIG. 10. FIG. 10 is a flowchart showing the method of controlling the vehicle according to the exemplary embodiment. The method described hereinbelow may be executed by a controller. Referring to FIG. 10, the method of controlling the vehicle 1 according to the exemplary embodiment may include receiving a channel input from a user (1000). In response to receiving the channel, the operating frequency band may be determined based on the received channel (1100).

Thereafter, based on the determined operating frequency band, it may be determined whether a signal having the determined operating frequency band is a first signal (1200). When the signal is the first signal (YES in operation 1200), the third switch 122 may be operated for the antenna 120 to receive the first signal (1201). The operation of the third switch 122 may include operating the third switch 122 to change the contact point of the conductor 121 included in the antenna 120 and the third switch 122. In addition, the first switch 113 may be operated to connect the antenna 120 to the first amplifier 111-1 designed to amplify the first signal (1202). In addition, the fourth switch 111-10 may be operated to change the impedance of the first amplifier 111-1 (1203). The operation of the fourth switch 111-10 may include connecting the fourth switch 111-10 to one of the plurality of inductors 111-11 included in the first amplifier 111-1 based on the reception strength of the first signal received from the antenna 120. Thereafter, the second switch 122 may be operated to connect the amplifying part 111 to the first tuner 112-1 designed to tune the amplified first signal (1204).

In addition, the method of controlling the vehicle 1 according to the exemplary embodiment may include determining whether the signal having the determined operating frequency band is the first signal (1200), and when the signal is not determined to be the first signal (NO in operation 1200), the third switch 122 may be operated for the antenna 120 to receive a second signal (1211). The operation of the third switch 122 may include operating the third switch 122 to change the contact point of the third switch 122 and the conductor 121 included in the antenna 120. In addition, the first switch 113 may be operated to connect the antenna 120 to the second amplifier 111-2 designed to amplify the second signal (1212). In particular, the fourth switch 111-10 may be operated to change the impedance of the second amplifier 111-2 based on the reception strength of the second signal received from the antenna 120 (1213). The operation of the fourth switch 111-10 may include connecting the fourth switch 111-10 to one of the plurality of inductors 111-11 included in the first amplifier 111-1 based on the reception strength of the second signal received from the antenna 120. Thereafter, the second switch 122 may be operated to connect the amplifying part 111 to the second tuner 112-2 designed to tune the amplified second signal (1214).

Although not shown in the drawings, the method of controlling the vehicle 1 according to the exemplary embodiment may determine whether the signal having the determined operating frequency band is a third signal, a fourth signal, or the like having a different operating frequency band, when the signal having the determined operating frequency band is not determined to be the second signal. It should be obvious to the person skilled in the art that the antenna 120 has been described in terms of receiving only the first signal and the second signal for the sake of convenience in description but is not limited thereto.

Meanwhile, it would be understood by those skilled in the art that at least one component may be added or omitted to correspond to the performances of the components of the vehicle 1 or the antenna apparatus 100. In addition, the mutual positions of the components may be changed to correspond to the performance or structure of the system. Meanwhile, the components of the vehicle 1 or the antenna apparatus 100 refer to software components and/or hardware components, such as a field programmable gate array (FPGA) and an application specific integrated circuit (ASIC).

Meanwhile, the disclosed exemplary embodiments may be embodied in the form of a recording medium storing instructions executable by a computer. The instructions may be stored in the form of program code and, when executed by a processor, may generate a program module to perform the operations of the disclosed exemplary embodiments. The recording medium may be embodied as a non-transitory computer-readable recording medium. The non-transitory computer-readable recording medium may include all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, only a single antenna and a single feeder cable are used regardless of the type of a channel input from a user, and the manufacturing cost may be reduced. In addition, a path for a reception signal is set based on each channel via switches, and an undesired reception path is blocked; therefore, signal loss and signal interference are prevented, thereby improving the signal quality.

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A vehicle, comprising:
   an antenna configured to receive a first signal and a second signal having different operating frequency bands;
   an amplifying part including a first amplifier configured to amplify the first signal and a second amplifier configured to amplify the second signal;
   a receiving part including a first tuner configured to tune the first signal amplified by the amplifying part and a second tuner configured to tune the second signal amplified by the amplifying part;
   a first switch configured to connect the antenna to the first amplifier or the second amplifier;
   a second switch configured to connect the amplifying part to the first tuner or the second tuner;
   an input part configured to receive a channel from a user; and a controller configured to individually operate the first switch and the second switch based on an operating frequency band of the received channel.

2. The vehicle of claim 1, wherein the controller operates the first switch to connect the first amplifier to the antenna when a signal having the operating frequency band of the received channel is the first signal.

3. The vehicle of claim 1, wherein the controller operates the second switch to connect the first tuner to the amplifying part when a signal having the operating frequency band of the received channel is the first signal.

4. The vehicle of claim 1, wherein the antenna includes a conductor configured to receive the first signal and the second signal and a third switch configured to adjust an operating frequency band of the conductor, and wherein the controller operates the third switch and the antenna receives the first signal when a signal having the operating frequency band of the received channel is the first signal.

5. The vehicle of claim 4, wherein the third switch is connectable to the conductor at a plurality of contact points, and wherein the controller operates the third switch to vary the contact point of the third switch and the conductor.

6. The vehicle of claim 1, wherein the first amplifier includes a plurality of inductors and a fourth switch, and wherein the controller operates the fourth switch to change an impedance of the first amplifier based on reception strength of the first signal received from the antenna.

7. The vehicle of claim 6, wherein the fourth switch connects one of the plurality of inductors to the antenna, and wherein the controller connects the fourth switch to one of the plurality of inductors to change the impedance of the first amplifier based on the reception strength of the first signal received from the antenna.

8. The vehicle of claim 1, wherein each of the first signal and the second signal corresponds to at least one a frequency modulation (FM) signal, an amplitude modulation (AM) signal, a digital multimedia broadcasting (DMB) signal, a digital audio broadcasting (DAB) signal, and integrated services digital broadcasting-terrestrial (ISDB-T) signal.

9. The vehicle of claim 1, wherein each of the first amplifier and the second amplifier is designed to amplify at least one of a frequency modulation (FM) signal, an amplitude modulation (AM) signal, a digital multimedia broadcasting (DMB) signal, a digital audio broadcasting (DAB) signal, and integrated services digital broadcasting-terrestrial (ISDB-T) signal.

10. A method of controlling a vehicle, comprising:
receiving, by a controller, a channel from a user;
determining, by the controller, an operating frequency band based on the received channel; and
individually operating, by the controller, a first switch configured to connect an antenna to a first amplifier or a second amplifier and a second switch configured to connect an amplifying part including the first amplifier and the second amplifier to a first tuner or a second tuner based on the determined operating frequency band.

11. The method of claim 10, further comprising:
operating, by the controller, the first switch to connect the first amplifier to the antenna when a signal having the determined operating frequency band is a first signal.

12. The method of claim 10, further comprising:
operating, by the controller, the second switch to connect the first tuner to the amplifying part when a signal having the determined operating frequency band is a first signal.

13. The method of claim 10, further comprising:
operating, by the controller, a third switch and receiving a first signal with the antenna when a signal having the determined operating frequency band is the first signal.

14. The method of claim 13, wherein the operation, by the controller, of the third switch and the receiving of the first signal with the antenna includes operating, by the controller, the third switch to vary a contact point of the third switch and a conductor included in the antenna.

15. The method of claim 10, further comprising:
operating, by the controller, a fourth switch to change an impedance of the first amplifier based on reception strength of a first signal received from the antenna.

16. The method of claim 15, wherein the operation, by the controller, of the fourth switch to change the impedance of the first amplifier based on the reception strength of the first signal received from the antenna includes connecting, by the controller, the fourth switch to one of a plurality of inductors included in the first amplifier based on the reception strength of the first signal received from the antenna.

17. An antenna apparatus, comprising:
an antenna configured to receive a first signal and a second signal having different operating frequency bands;
an amplifying part including a first amplifier configured to amplify the first signal and a second amplifier configured to amplify the second signal;
a receiving part including a first tuner configured to tune the first signal amplified by the amplifying part and a second tuner configured to tune the second signal amplified by the amplifying part;
a first switch configured to connect the antenna to the first amplifier or the second amplifier;
a second switch configured to connect the amplifying part to the first tuner or the second tuner; and
a controller configured to individually operate the first switch and the second switch based on a channel selected by a user.

18. The antenna apparatus of claim 17, wherein the controller operates the first switch to connect the first amplifier to the antenna when a signal having an operating frequency band of the selected channel is the first signal.

19. The antenna apparatus of claim 17, wherein the controller operates the second switch to connect the first tuner to the amplifying part when a signal having an operating frequency band of the selected channel is the first signal.

20. The antenna apparatus of claim 17, wherein the antenna includes a conductor configured to receive the first signal and the second signal and a third switch configured to adjust an operating frequency band of the conductor, and wherein the controller operates the third switch and the antenna receives the first signal when a signal having an operating frequency band of the selected channel is the first signal.

* * * * *